(12) United States Patent
Tecza et al.

(10) Patent No.: US 9,115,756 B2
(45) Date of Patent: Aug. 25, 2015

(54) REPLACEABLE AXIAL JOURNAL FOR AUXILIARY BEARINGS

(71) Applicants: Joseph A. Tecza, Scio, NY (US); Scott Hanaka, Wellsville, NY (US)

(72) Inventors: Joseph A. Tecza, Scio, NY (US); Scott Hanaka, Wellsville, NY (US)

(73) Assignee: Dresser-Rand Company, Olean, NY (US)

( * ) Notice: Subject to any disclaimer, the term of this patent is extended or adjusted under 35 U.S.C. 154(b) by 0 days.

(21) Appl. No.: 14/190,755

(22) Filed: Feb. 26, 2014

(65) Prior Publication Data

US 2014/0254962 A1 Sep. 11, 2014

Related U.S. Application Data

(60) Provisional application No. 61/769,938, filed on Feb. 27, 2013.

(51) Int. Cl.
| | |
|---|---|
| *F16C 33/00* | (2006.01) |
| *F16C 32/04* | (2006.01) |
| *F16C 39/02* | (2006.01) |
| *F16C 19/54* | (2006.01) |

(52) U.S. Cl.
CPC ............ *F16C 32/0402* (2013.01); *F16C 19/54* (2013.01); *F16C 32/0442* (2013.01); *F16C 39/02* (2013.01); *F16C 2226/16* (2013.01); *F16C 2226/80* (2013.01); *Y10T 29/49696* (2015.01)

(58) Field of Classification Search
CPC ...... F16C 21/00; F16C 32/04; F16C 32/0402; F16C 19/54; F16C 32/0442; F16C 39/02; F16C 2226/16; F16C 2226/80; Y10T 29/49696
USPC ........... 384/91, 126–128, 156, 183–186, 295, 384/296, 428, 510, 537–540, 557, 561, 562, 384/564, 585; 403/305, 374.1, 409.1
See application file for complete search history.

(56) References Cited

U.S. PATENT DOCUMENTS

| | | | | |
|---|---|---|---|---|
| 3,157,442 | A * | 11/1964 | Gaubatz ........................ | 384/540 |
| 5,269,607 | A * | 12/1993 | Lawson ........................ | 384/538 |
| 5,775,816 | A * | 7/1998 | Baranek et al. ............... | 384/278 |
| 6,261,061 | B1 * | 7/2001 | Pfaffenberger ............... | 384/585 |
| 2009/0202188 | A1 * | 8/2009 | Fox et al. ...................... | 384/557 |

\* cited by examiner

*Primary Examiner* — James Pilkington
(74) *Attorney, Agent, or Firm* — Edmonds & Nolte, PC

(57) ABSTRACT

A system and method are provided for an auxiliary bearing system. The system and method may include a sleeve extending circumferentially about a rotary shaft and coupled thereto. The system and method may also include an axial journal disposed circumferentially about the rotary shaft and adjacent an axial end of the sleeve. The system and method may further include a locking nut coupled to the rotary shaft. The locking nut may be configured to force the axial journal to engage the axial end of the sleeve to at least partially resist axial movement of the axial journal along the rotary shaft. The system and method may further include a gripping assembly disposed circumferentially about the rotary shaft. The gripping assembly may be configured to engage the axial journal to at least partially resist radial movement of the axial journal relative to the rotary shaft.

20 Claims, 5 Drawing Sheets

REPLACEABLE AXIAL JOURNAL FOR AUXILIARY BEARINGS

CROSS REFERENCE TO RELATED APPLICATIONS

This application claims priority to U.S. Provisional Patent Application having Ser. No. 61/769,938, which was filed Feb. 27, 2013. This priority application is hereby incorporated by reference in its entirety into the present application to the extent consistent with the present application.

BACKGROUND

In turbomachine systems, a number of original equipment manufacturers (OEMs) are replacing conventional bearing systems with magnetic bearing systems. Magnetic bearing systems utilize magnetic forces to hold a rotary shaft of the turbomachine in a desired position, as opposed to, for example, the forces of a rolling element bearing or oil film bearing. However, failure of the magnetic bearing systems in these turbomachines typically causes the rotary shaft to fall or drop onto an adjacent mechanical surface. Static and dynamic radial and thrust forces acting on the rotary shaft after the failure of the magnetic bearing system may cause substantial damage to the rotary shaft and/or the surrounding components. Accordingly, turbomachine systems often include an auxiliary bearing system configured to "catch" or support the rotary shaft upon failure of the magnetic bearing system to avoid damaging the rotary shaft and/or the surrounding components.

Auxiliary bearing systems may typically be inactive during normal operating conditions when the rotary shaft is supported by the magnetic bearing system. This may be achieved by providing both an axial and radial clearance between interfacing surfaces of the auxiliary bearing system and the rotary shaft. When the magnetic bearing system fails, de-levitation of the rotary shaft occurs and the rotary shaft drops radially onto the auxiliary bearing system. Appropriate portions of the auxiliary bearing system may then compensate for the failed magnetic bearing system by accelerating up to the rotational speed of the rotary shaft. In addition to compensating for the rotational speed of the rotary shaft, the auxiliary bearing system may also provide radial and axial positioning for the rotary shaft. Axial and radial positioning may be provided by axial journals and/or sleeves coupled to the rotary shaft that interface with an inertia ring of the auxiliary bearing system. In positioning the rotary shaft, the axial journals may be subject to extreme accelerations and/or loads from the static and dynamic radial and thrust forces acting on the rotary shaft. Accordingly, repeated failure of the magnetic bearing system to levitate the shaft often results in the wearing and eventual damage of the axial journals, thereby limiting the life of the auxiliary bearing system.

In view of the foregoing, replacement of one or more damaged axial journals in an auxiliary bearing system is often carried out during the operational life of the turbomachine. Typically, axial journals may be coupled to the rotary shaft via an interference fit (e.g., shrink fit). The interference fit used to couple the axial journals, however, may require special tooling (e.g., oven or induction heater) for the removal and replacement of the axial journals, thereby increasing cost and time for replacement thereof.

What is needed, then, is an improved auxiliary bearing system and method of assembly thereof, including a facile and easily replaceable axial journal capable of supporting radial loads while maintaining concentricity or alignment of the rotary shaft.

SUMMARY

Embodiments of the disclosure may provide an auxiliary bearing system. The auxiliary bearing system may include a sleeve extending circumferentially about a rotary shaft and coupled thereto. The auxiliary bearing system may also include an axial journal disposed circumferentially about the rotary shaft and adjacent an axial end of the sleeve. The auxiliary bearing system may further include a locking nut coupled to the rotary shaft. The locking nut may be configured to force the axial journal to engage the axial end of the sleeve to at least partially resist axial movement of the axial journal along the rotary shaft. The auxiliary bearing system may further include a gripping assembly disposed circumferentially about the rotary shaft. The gripping assembly may be configured to engage the axial journal to at least partially resist radial movement of the axial journal relative to the rotary shaft.

Embodiments of the disclosure may further provide another auxiliary bearing system. The auxiliary bearing system may include a sleeve extending circumferentially about a rotary shaft and coupled thereto. The auxiliary bearing system may also include an axial journal disposed circumferentially about the rotary shaft and adjacent an axial end of the sleeve. The auxiliary bearing system may further include a locking nut coupled to the rotary shaft. The locking nut may be configured to force the axial journal to engage the axial end of the sleeve to at least partially resist axial movement of the axial journal along the rotary shaft. The auxiliary bearing system may further include a gripping assembly disposed circumferentially about the rotary shaft. The gripping assembly may be configured to engage the axial journal to at least partially resist radial movement of the axial journal relative to the rotary shaft. The auxiliary bearing system may also include an inertia ring disposed circumferentially about the sleeve. A gap may be defined between the inertia ring and the sleeve when a primary bearing system supports the rotary shaft. The inertia ring may engage and rotate with the sleeve and the rotary shaft when the primary bearing system does not support the rotary shaft. The axial journal may engage an axial end of the inertia ring to resist axial movement of the rotary shaft when the primary bearing system does not support the rotary shaft.

Embodiments of the disclosure may further provide a method for securing an axial journal of an auxiliary bearing system. The method may include coupling a sleeve circumferentially about a rotary shaft. The method may also include disposing the axial journal circumferentially about the rotary shaft and adjacent an axial end of the sleeve. The method may further include coupling a locking nut to the rotary shaft to force the axial journal to engage the axial end of the sleeve. Forcing the axial journal to engage the axial end of the sleeve may prevent axial movement of the axial journal along the rotary shaft. The method may further include disposing a gripping assembly circumferentially about the rotary shaft. The gripping assembly may engage the axial journal to at least partially resist radial movement of the axial journal relative to the rotary shaft.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1A:
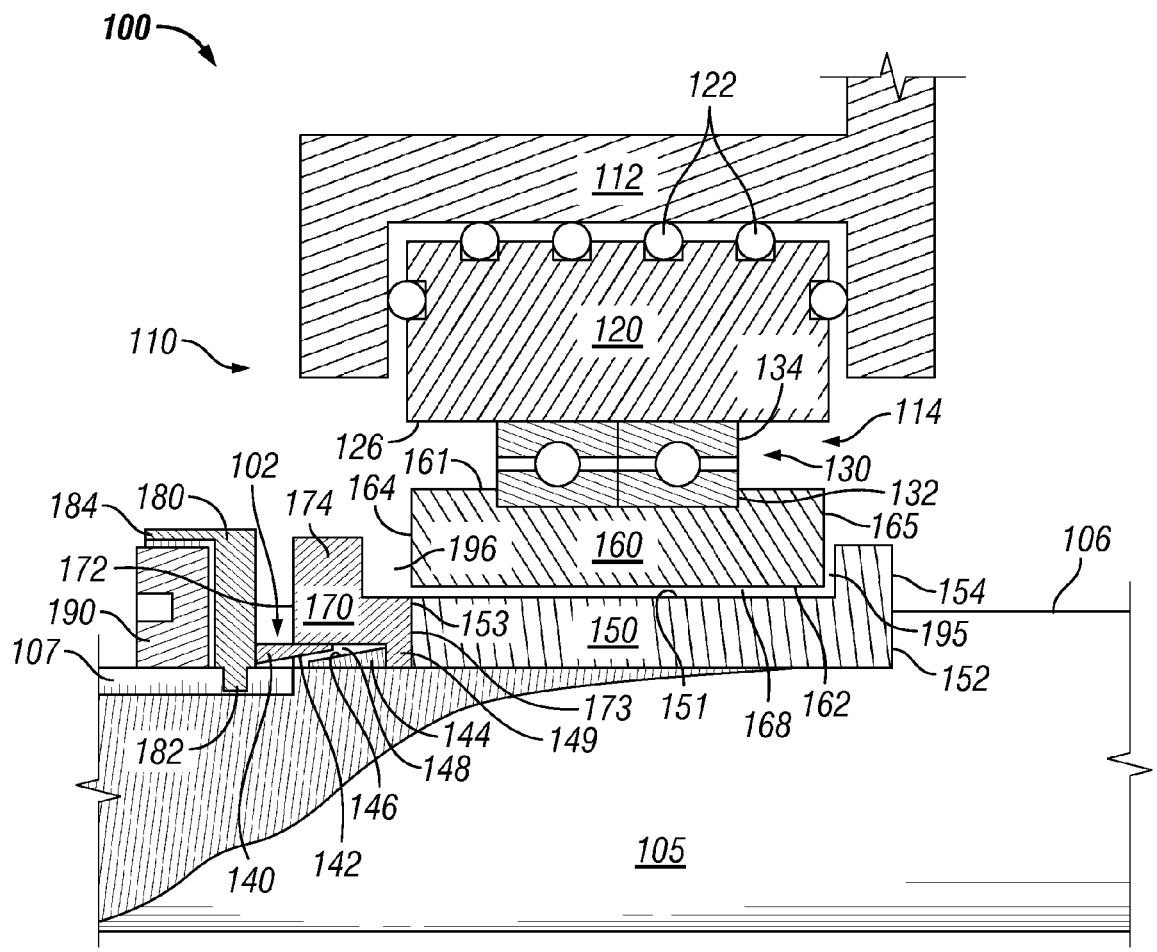
FIG. 1A illustrates a partial, cross-sectional view of an exemplary auxiliary bearing system configured to support a rotary shaft, the auxiliary bearing system including an exemplary axial journal and an exemplary gripping assembly, the axial journal decoupled from the rotary shaft, according to one or more embodiments disclosed.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1A illustrates a partial, cross-sectional view of an exemplary auxiliary bearing system 110 configured to support a rotary shaft 105, the auxiliary bearing system 110 including an exemplary axial journal 170 and an exemplary gripping assembly 102, the axial journal 170 decoupled from the rotary shaft 105, according to one or more embodiments. The auxiliary bearing system 110 may be a part of an exemplary rotor system 100. The rotor system may include a casing (not shown) and a rotary shaft 105 disposed therein. The rotary shaft 105 may be supported by one or more primary bearing systems (e.g., active magnetic bearing systems) (not shown) positioned at one or more axially-spaced locations along the rotary shaft 105, including, but not limited to, opposing end portions of the rotary shaft 105. The rotary shaft 105 may be a part of a turbomachine. Illustrative turbomachines may include, but are not limited to turbines, motors, generators, compressors, such as rotary compressors, or any other rotating equipment assembly, including a turboset.

The auxiliary bearing system 110 may include an auxiliary bearing housing 112 and a bearing cartridge 114. The auxiliary bearing system 110 may be mounted or coupled to the casing of the rotor system 100 via the auxiliary bearing housing 112. The auxiliary bearing housing 112 may provide support for the active magnetic bearing systems. The cartridge 114 may include one or more mounting rings 120, inertia rings 160, auxiliary bearing journals or sleeves 150, rolling element bearings 130, or any combination thereof. The cartridge 114 may be coupled to the auxiliary bearing housing 112 via the mounting ring 120. The mounting ring 120 may be flexibly mounted to the auxiliary bearing housing 112 via one or more resilient mounts 122. The resilient mounts 122 may be or include one or more O-rings extending within annular grooves formed in an inner wall of the auxiliary bearing housing 112 and/or an outer wall of the mounting ring 120. In addition to, or in substitution of the O-rings, the resilient mounts 122 may include one or more Borelli ribbons, quad or square rings, bump springs, metal mesh pads, bump foils, tolerance rings, curved beams, squirrel cage flexure arrangements, a squeeze film dampers, or any combination thereof. The Borelli ribbon may include a resilient ribbon-shaped structure and the bump foil may include a foil having a series of uniform, axially-extending corrugations or bumps.

The rolling element bearings 130 may include an inner race 132 and an outer race 134. The rolling element bearings 130 may extend circumferentially about and engage an inner wall 126 of the mounting ring 120 via the outer race 134 and an outer wall 161 of the inertia ring 160 via the inner race 132, as shown in FIG. 1A. The rolling element bearings 130 may be configured to carry or support both an axial or thrust load and a radial load. The rolling element bearings 130 may be arranged such that both the inner race 132 and the outer race 134 rotate together with the auxiliary bearing system 110. The rolling element bearings 130 may include, but are not limited to angular contact rolling element bearings, a single row deep groove ball bearing, a double row deep groove ball bearing, or other types of bearings known in the art, or any combination thereof.

The inertia ring 160 may be disposed near or adjacent the sleeve 150 through which the rotary shaft 105 extends. For example, as shown in FIG. 1A, the inertia ring 160 may be disposed radially outward of the sleeve 150. During one or more modes of operating the rotor system 100, a radial clearance or gap 168 may be defined between the inertia ring 160 and the sleeve 150. For example, as shown in FIG. 1A, during the rotation of the rotary shaft 105 and its normal support by the active magnetic bearing systems, the radial clearance 168 may be defined between an inner surface 162 of the inertia ring 160 and an outer surface 151 of the sleeve 150.

The sleeve 150 may circumferentially extend about and be coupled to or engage an outer surface 106 of the rotary shaft 105. The sleeve 150 may be an annular ring structure including a first axial end 152 that defines a projection or lip 154. As shown in FIG. 1A, the projection 154 may extend radially outward from the rotary shaft 105 and may be defined or shaped such that the projection 154 may be coincident with a first axial end 165 of the inertia ring 160. During one or more modes of operating the rotor system 100, an axial clearance 195 may be defined between the axial end 165 of the inertia ring 160 and the projection 154 of the sleeve 150.

An axial journal 170 may be disposed near or adjacent a second axial end 153 of the sleeve 150. The axial journal 170 may be an annular ring structure including a first axial end 172 that defines a projection 174. As shown in FIG. 1A, the projection 174 may extend radially out from the rotary shaft 105, and may be defined or shaped such that the projection 174 may be coincident with a second axial end 164 of the inertia ring 160. The axial journal 170 may engage and/or be secured to the rotary shaft 105 and/or the sleeve 150 to support the rotary shaft 105 when a radial and/or an axial load is applied thereto. As will be described below, the axial journal 170 may engage and/or be secured to the rotary shaft 105 and/or the sleeve 150 via a variety of attachment methods or gripping assemblies. The gripping assemblies described herein may provide a system or method for replacing axial journals of an auxiliary bearing system without special tooling (e.g., oven or induction heater). It should be noted that several variations of the gripping assemblies disclosed herein may be undertaken without departing from the scope of the disclosure, including using any of the gripping assemblies individually or in combination.

A cup lock washer 180 may be disposed adjacent the axial journal 170 to provide an axial load or force to the axial journal 170. The cup lock washer 180 may secure the axial journal 170 to the sleeve 150 to prevent axial movement of the axial journal 170. The cup lock washer 180 may include one or more anti-rotation elements, illustrated as a tab 182 in FIG. 1A. For example, the cup lock washer 180 may include one or more tabs 182 extending radially inward from an inner radial surface thereof. The tabs 182 may engage one or more slots 107 that extend radially into the rotary shaft 105. The engagement of the tabs 182 to the slots 107 may prevent rotation of the cup lock washer 180 with respect to the rotary shaft 105. In addition to, or in substitution of the tabs 182, the anti-rotation elements 182 may include, but are not limited to pins, tooth or gears, or any combination thereof. The cup lock washer 180 may also include a rim 184 for receiving a locking nut 190. The rim 184 may deform to secure or fasten the locking nut 190 to the cup lock washer 180.

The locking nut 190 may be fastened or secured to the rotary shaft 105 to provide an axial preload to the cup lock washer 180, the axial journal 170, the sleeve 150, or any combination thereof. The locking nut 190 may be secured to the rotary shaft 105 via threads defined on an inner radial surface of the locking nut 190 that may engage threads on the rotary shaft 105. As the locking nut 190 is tightened toward the sleeve 150, the cup lock washer 180 may translate or move to engage the axial journal 170 to provide an axial load to the axial journal 170 and secure the axial journal 170 to the sleeve 150.

As shown in FIG. 1A, a gripping assembly 102 may include two or more conical rings 140, 144 disposed in an annular space 148 between the axial journal 170 and the rotary shaft 105. The annular space 148 may extend the entire axial length of the axial journal 170 or through a portion thereof. For example, as shown in FIG. 1A, the annular space 148 may extend through a portion of the axial length of the axial journal 170 from the first axial end 172 to a projection 149 defined on the second axial end 173 of the axial journal 170.

The conical rings 140, 144 may be or include a continuous annular ring structure, an annular ring structure having partial axial splits, or multiple ring segments. If the conical rings 140, 144 include multiple ring segments, the conical rings 140, 144 may further include a retainer ring (not shown) to hold or secure the ring segments in place. A first conical ring 140 may include a tapered surface 142 on an inner radial surface or diameter thereof and a second conical ring 144 may include a tapered surface 146 on an outer radial surface or diameter thereof. As shown in FIG. 1A, the first conical ring 140 and the second conical ring 144 may be disposed in the annular space 148 such that their respective tapered surfaces 142, 146 are directed to or face one another and/or overlap.

As shown in FIG. 1A, before securing the axial journal 170 to the rotary shaft 105 via the gripping assembly 102, the cup lock washer 180 and the locking nut 190 may be disposed on the rotary shaft 105 at a position axially offset from the axial journal 170. The conical rings 140, 144 may be disposed between the cup lock washer 180 and the axial journal 170. The second conical ring 144 may be disposed in the annular space 148 and may abut the protrusion 149 of the axial journal 170. The first conical ring 140 may be disposed adjacent the second conical ring 144 such that its tapered surface 142 faces the tapered surface 146 of the second conical ring 144.

Figure 1B:
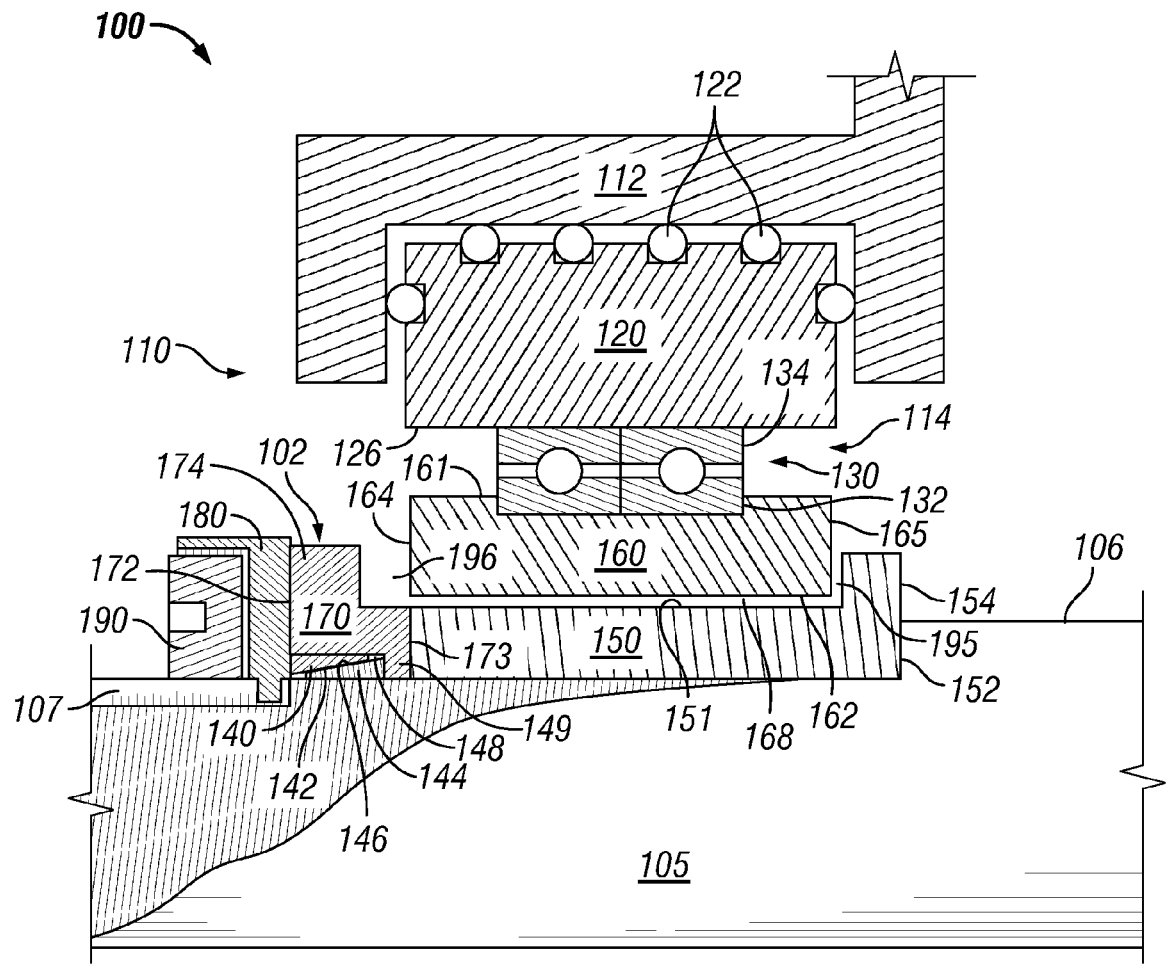
FIG. 1B illustrates a partial, cross-sectional view of the exemplary auxiliary bearing system of FIG. 1A including the exemplary axial journal coupled to the rotary shaft via the exemplary gripping assembly, according to one or more embodiments disclosed.

FIG. 1B illustrates a partial, cross-sectional view of the exemplary auxiliary bearing system 110 of FIG. 1A including the exemplary axial journal 170 coupled to the rotary shaft 105 via the exemplary gripping assembly 102, according to one or more embodiments. As shown in FIG. 1B, to grippingly engage and secure the axial journal 170 to the rotary shaft 105, the locking nut 190 may be threaded onto the rotary shaft 105. As the locking nut 190 is tightened toward the sleeve 150, the cup lock washer 180 may translate or move the first conical ring 140 toward the second conical ring 144 until eventually engaging the tapered surfaces 142, 146 of the conical rings 140, 144 to one another. The engagement of the tapered surfaces 142, 146 results in a biasing or wedging action between the tapered surfaces 142, 146 such that the conical rings 140, 144 exert opposing radial forces to the axial journal 170 and the rotary shaft 105 to grip or secure the axial journal 170 and the rotary shaft 105 to one another. The biasing or wedging action may secure the axial journal 170 to the rotary shaft 105 such that when an axial and/or radial load is applied to the axial journal 170, movement of the axial journal 170 in the corresponding axial and/or radial direction is minimized or substantially prevented. While FIG. 1A and FIG. 1B illustrate the first conical ring 140 disposed adjacent the cup lock washer 180, the orientation of the first and second conical rings 140, 144 are interchangeable. Accordingly, the conical rings 140, 144 may be oriented such that either the first conical ring 140 or the second conical ring 144 may be disposed adjacent the cup lock washer 180 and/or the axial journal 170.

Figure 2:
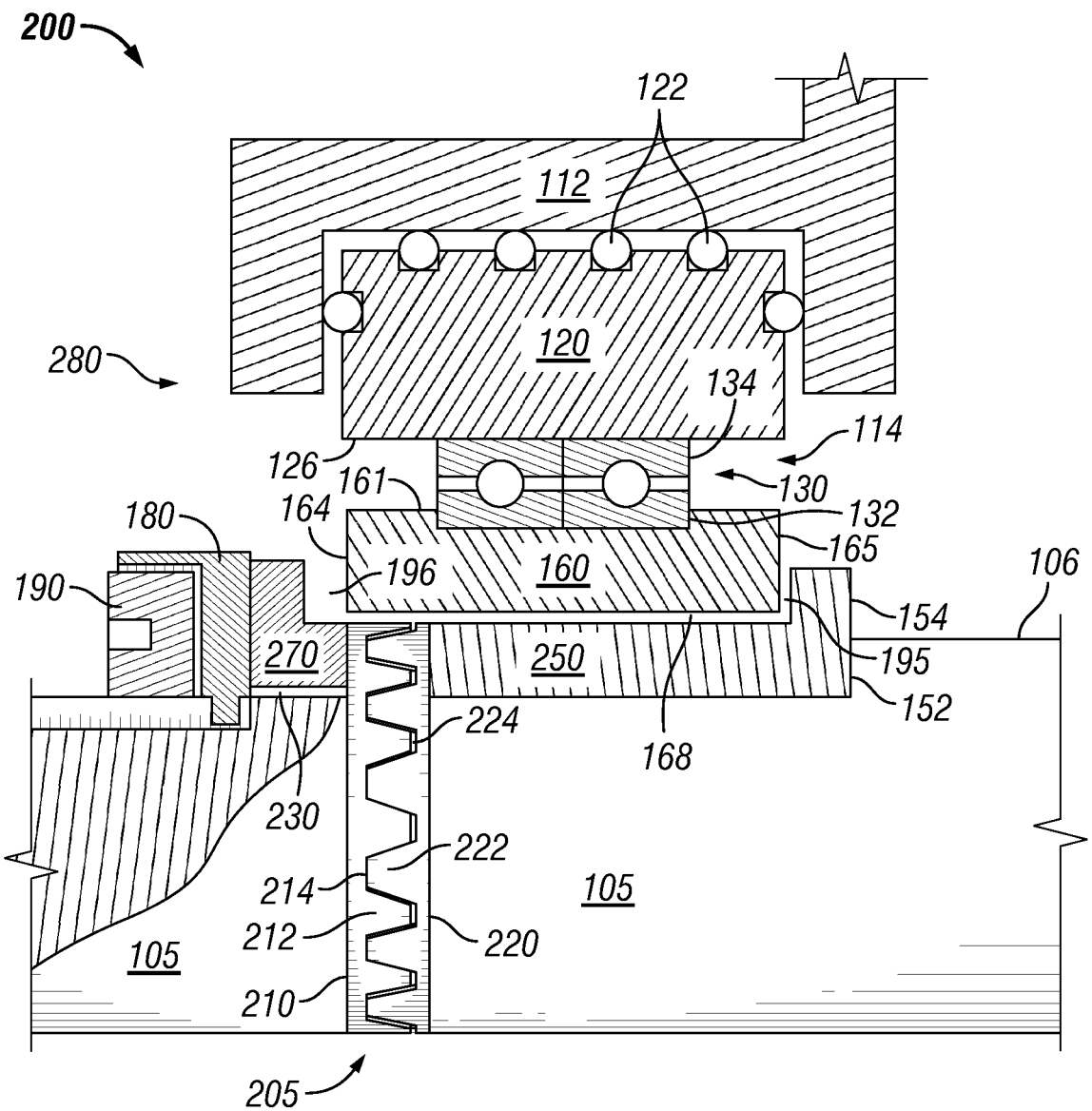
FIG. 2 illustrates a partial, cross-sectional view of another exemplary auxiliary bearing system of another exemplary rotor system, including an exemplary axial journal coupled to a sleeve via an exemplary gripping assembly, according to one or more embodiments disclosed.

FIG. 2 illustrates a partial, cross-sectional view of another exemplary auxiliary bearing system 280 of another exemplary rotor system 200, including an exemplary axial journal 270 coupled to a sleeve 250 via an exemplary gripping assembly 205, according to one or more embodiments. The auxiliary bearing system 280 may be similar in some respects to the auxiliary bearing system 110 described above and therefore may be best understood with reference to the description of FIG. 1A and FIG. 1B where like numerals designate like components and will not be described again in detail. As shown in FIG. 2, the gripping assembly 205 may be or include one or more axial splines 210, 220 interposed between the axial journal 270 and the sleeve 250. The axial splines 210, 220 may be defined by the axial journal 270 and/or the sleeve 250, or the axial splines 210, 220 may be defined by a separate annular ring or disk (not shown) coupled to the axial journal 270 and/or the sleeve 250. The axial spline 210 of the axial journal 270 may be shaped to mate with the corresponding axial spline 220 of the sleeve 150. For example, the axial spline 210 of the axial journal 270 may include a plurality of offset ridges or teeth 212 configured to mate with corresponding grooves 224 in the sleeve 250. Similarly, the sleeve 250 may include a plurality of offset ridges or teeth 222 configured to mate with corresponding grooves 214 in the axial journal 270.

The teeth 212, 222 of the axial splines 210, 220 may include various coupling shapes or designs. Illustrative coupling designs of the axial splines 210, 220 may include, but are not limited to involute splines (e.g., CURVIC® coupling), prismatic or flat-sided splines (e.g., Hirth coupling), axially straight splines, or another type of face gear coupling known in the art, which may allow transmission of a radial load from the axial journal 270 to the sleeve 250 and/or the sleeve 250 to the axial journal 270. A Hirth coupling may be or include triangularly shaped ridges or teeth 212, 222 that may extend along a radius of the axial journal 270 and/or sleeve 250 and taper toward a central axis of the axial journal 270 and/or sleeve 250. A CURVIC® coupling may be or include conical or convexly shaped protrusions or teeth 212, 222 that extend along a radius of the axial journal 270 and/or the sleeve 250. The axial splines 210, 220 may allow a radial load applied to the axial journal 270 to be transferred or translated to the sleeve 250 and/or the rotary shaft 105.

To grippingly engage and secure the axial journal 270 to the sleeve 250, the locking nut 190 may be threaded onto the rotary shaft 105. As the locking nut 190 is tightened toward the sleeve 250, the cup lock washer 180 may translate or move the axial journal 270 toward the sleeve 250 until eventually engaging the axial spline 210 of the axial journal 270 with the axial spline 220 of the sleeve 250. The engagement of the axial splines 210, 220 may provide an annular space 230 between the axial journal 270 and the rotary shaft 105. The annular space 230 may extend the entire axial length of the axial journal 270, thereby suspending the axial journal 270 radially about the rotary shaft 105. Accordingly, the engagement of the axial splines 210, 220 to one another may secure the axial journal 270 to the sleeve 250 such that radial loads applied thereto are applied or translated to the sleeve 250 and/or the axial splines 210, 220.

As discussed above, the gripping assembly 205 illustrated in FIG. 2 may allow any radial load applied to the axial journal 270 to be supported by the axial splines 210, 220 and/or the sleeve 250. For example, a radial load applied to the axial journal 270 may be transferred or translated to the sleeve 250 via the axial splines 210, 220. The gripping assembly 205 may also allow any axial load applied to the axial journal 270 to be supported by the locking nut 190 and/or the cup lock washer 180. The gripping assembly 205 may also allow for a radial differential expansion between the teeth 212, 224 of the axial splines 210, 220. For example, the gripping assembly 205 may permit radial sliding between the axial splines 210, 220 of the axial journal 270 and the sleeve 250. The axial splines 210, 220 may provide, increase, or improve alignment or concentricity between the rotary shaft 105, the axial journal 270, the sleeve 250, or any combination thereof. The gripping assembly 205 may also provide a method to replace the axial journal 270 without special tooling, such as an oven or induction heater.

Figure 3:
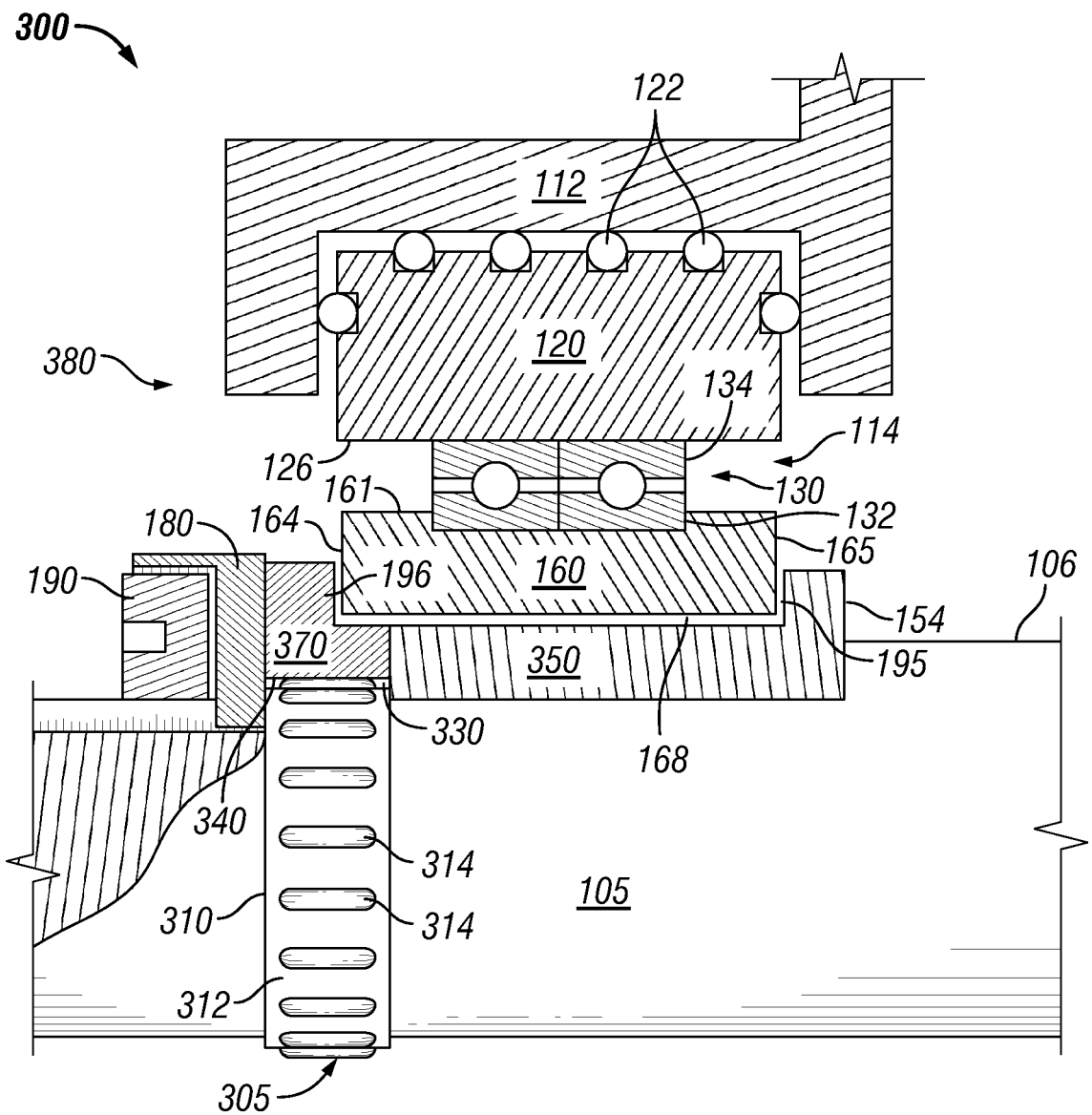
FIG. 3 illustrates a partial, cross-sectional view of another exemplary auxiliary bearing system of another exemplary rotor system, including an exemplary axial journal coupled to a rotary shaft via an exemplary gripping assembly, according to one or more embodiments disclosed.

FIG. 3 illustrates a partial, cross-sectional view of another exemplary auxiliary bearing system 380 of another exemplary rotor system 300, including an exemplary axial journal 370 coupled to the rotary shaft 105 via an exemplary gripping assembly 305, according to one or more embodiments. The auxiliary bearing system 380 may be similar in some respects to the auxiliary bearing system 110 described above and therefore may be best understood with reference to the description of FIG. 1A and FIG. 1B where like numerals designate like components and will not be described again in detail. As shown in FIG. 3, the gripping assembly 305 may be or include one or more tolerance rings 310 disposed in an annular space 330 between the axial journal 370 and the rotary shaft 105. The annular space 330 may extend the entire length of the axial journal 370 or may extent through a portion of the axial length of the axial journal 370. The tolerance ring 310 may include an annular ring 312 having one or more projections 314 that may extend radially outward from an outer surface of the annular ring 312 and/or radially inward from an inner surface of the annular ring 312. The projections 314 may be ordered or randomly oriented about the annular ring 312. The projections 314 may be or include, but are not limited to, corrugations, ridges, waves, fingers, or any combination thereof. The tolerance ring 310 may be disposed in the annular space 330 such that the projections 314 are compressed between an inner radial surface 340 of the axial journal 370 and/or the outer surface 106 of the rotary shaft 105. The projections 314 may exert a radial force or load against the axial journal 370 and/or the rotary shaft 105, thereby providing an interference fit therebetween. Accordingly, any radial and/or axial load applied to the axial journal 370 may be transmitted via the tolerance ring 310 to the rotary shaft 105. As such, the tolerance ring 310 may provide, increase, or improve alignment or concentricity of the rotary shaft 105, the axial journal 370, the sleeve 350, or any combination thereof.

To grippingly engage and secure the axial journal 370 to the rotary shaft 105, the tolerance ring 310 may be disposed adjacent the annular space 330 between the axial journal 370 and the cup lock washer 180 and an axial load may be applied to the tolerance ring 310 to direct the tolerance ring 310 in the annular space 330. The axial load or force may be applied from the tightening of the locking nut 190 onto the rotary shaft 105. As the locking nut 190 is tightened toward the sleeve 150, the cup lock washer 180 may translate or move the tolerance ring 310 into the annular space 330 until the projections 314 of the tolerance ring 310 engage the inner radial surface 340 of the axial journal 370 and/or the outer surface 106 of the rotary shaft 105.

In an exemplary operation of the rotor systems 100, 200, 300, the rotary shaft 105 may rotate in place and may be normally supported by the magnetic bearing systems. During the rotation of the rotary shaft 105 and its normal support by the magnetic bearing system, the radial clearance 168 may be defined between the inertia ring 160 and the sleeve 150, 250, 350. The rotary shaft 105 may be levitated relative to the casing and the inertia ring 160 by the magnetic bearing systems. The rotary shaft 105, the sleeve 150, 250, 350 coupled thereto, the axial journal 170, 270, 370, the cup lock washer 180, and the locking nut 190 all rotate relative to the casing, the inertia ring 160, the rolling element bearings 130, the auxiliary bearing housing 112, and the cartridge 114, all of which are generally stationary. The auxiliary bearing systems 110, 280, 380 described herein may not support the rotary shaft 105 during the normal operation of the rotor systems 100, 200, 300, that is, when the active magnetic bearing systems are supporting the rotary shaft 105.

When one or more of the magnetic bearing systems, which normally supports the rotary shaft 105, fail, the rotary shaft 105 delevitates so that the inertia ring 160 engages or contacts the sleeve 150, 250, 350, at which point the auxiliary bearing system 110, 280, 380 begins to at least partially support the rotating shaft 105. When supporting the rotating shaft 105, the auxiliary bearing system 110, 280, 380 and/or components thereof may be subject to a radial and/or axial load from the rotary shaft 105. Upon engagement of the inertia ring 160 and the sleeve 150, 250, 350, the projection 154 of the sleeve 150, 250, 350 and the projection 174 of the axial journal 170, 270, 370 may engage the axial ends 164, 165 of the inertia ring 160 to support both radial and/or axial loads from the rotary shaft 105.

Figure 4:
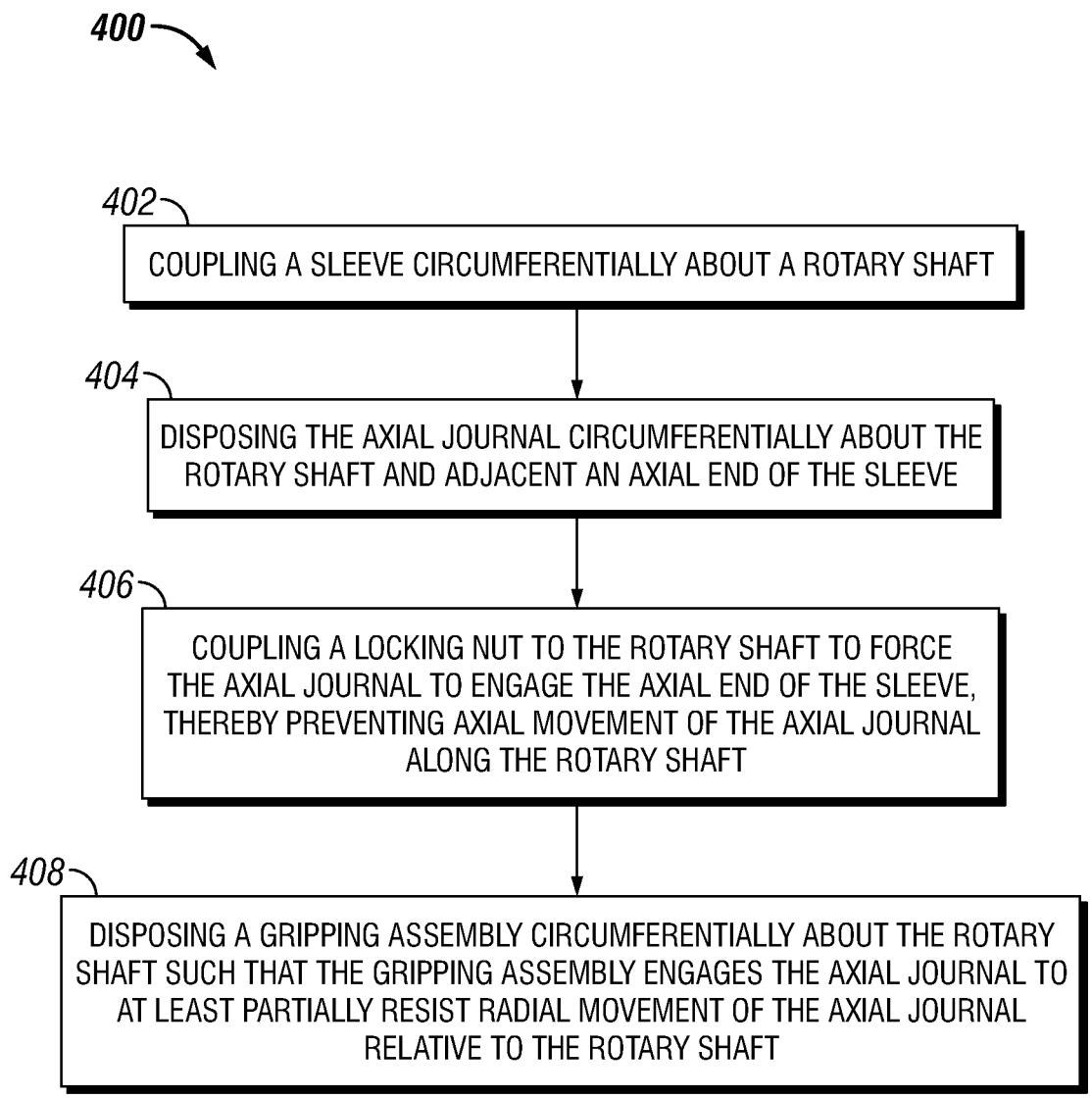
FIG. 4 is a flowchart illustrating a method for securing an axial journal to a rotary shaft or a sleeve of an auxiliary bearing system, according to one or more embodiments disclosed.

FIG. 4 is a flowchart illustrating a method 400 for securing an axial journal to a rotary shaft or a sleeve of an auxiliary bearing system, according to one or more embodiments.

The method 400 may include coupling a sleeve circumferentially about a rotary shaft, as shown at 402. The method 400 may also include disposing the axial journal circumferentially about the rotary shaft and adjacent an axial end of the sleeve, as shown at 404. The method 400 may also include coupling a locking nut to the rotary shaft to force the axial journal to engage the axial end of the sleeve, thereby preventing axial movement of the axial journal along the rotary shaft, as shown at 406. The method 400 may also include disposing a gripping assembly circumferentially about the rotary shaft such that the gripping assembly engages the axial journal to at least partially resist radial movement of the axial journal relative to the rotary shaft, as shown at 408.

Disposing the gripping assembly circumferentially about the rotary shaft, as shown at 408, may further include disposing the gripping assembly in an annular space between the axial journal and the rotary shaft. Disposing the gripping assembly in the annular space between the axial journal and the rotary shaft may further include engaging an inner radial surface of the axial journal and an outer radial surface of the rotary shaft with the gripping assembly to at least partially resist radial movement of the axial journal relative to the rotary shaft.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. An auxiliary bearing system, comprising:
   a sleeve extending circumferentially about a rotary shaft and coupled thereto;
   an axial journal disposed circumferentially about the rotary shaft and adjacent an axial end of the sleeve;
   a locking nut coupled to the rotary shaft and configured to force the axial journal to engage the axial end of the sleeve to prevent axial movement of the axial journal along the rotary shaft; and
   a gripping assembly disposed circumferentially about the rotary shaft and configured to engage the axial journal to at least partially resist radial movement of the axial journal relative to the rotary shaft.

2. The auxiliary bearing system of claim 1, wherein the gripping assembly is further disposed in an annular space between the axial journal and the rotary shaft, such that the gripping assembly engages an inner radial surface of the axial journal and an outer radial surface of the rotary shaft.

3. The auxiliary bearing system of claim 2, wherein the gripping assembly comprises a first conical ring having a tapered surface and a second conical ring having a tapered surface, the first and second conical rings being disposed in the annular space such that the tapered surface of the first conical ring and the tapered surface of the second conical ring radially oppose one another and at least partially overlap.

4. The auxiliary bearing system of claim 3, wherein coupling the locking nut to the rotary shaft forces the tapered surfaces of the first and second conical rings into gripping engagement between the inner radial surface of the axial journal and the outer radial surface of the rotary shaft.

5. The auxiliary bearing system of claim 2, wherein the gripping assembly comprises an annular ring having one or more projections extending radially therefrom, the annular ring being disposed in the annular space such that the one or more projections exert a radial load against the inner radial surface of the axial journal and the outer radial surface of the rotary shaft.

6. The auxiliary bearing system of claim 1, wherein the gripping assembly comprises a plurality of axial splines interposed between the axial journal and the sleeve, the plurality of axial splines comprising:
   a first axial spline comprising a plurality of teeth; and
   a second axial spline defining a plurality of grooves, the plurality of teeth configured to engage with the plurality of grooves in an interlocking fashion.

7. The auxiliary bearing system of claim 6, wherein the axial splines are selected from the group consisting of involute splines, prismatic splines, axially straight splines, and combinations thereof.

8. The auxiliary bearing system of claim 1, further comprising a lock washer interposed between the locking nut and the axial journal, the lock washer comprising a tab extending radially into and engaging a slot defined radially in the rotary shaft, such that the tab prevents rotational movement of the lock washer relative to the rotary shaft.

9. An auxiliary bearing system, comprising:
   a sleeve extending circumferentially about a rotary shaft and coupled thereto;
   an axial journal disposed circumferentially about the rotary shaft and adjacent an axial end of the sleeve;
   a locking nut threadably coupled to the rotary shaft and configured to force the axial journal to engage the axial end of the sleeve to at least partially resist axial movement of the axial journal along the rotary shaft;
   a gripping assembly disposed circumferentially about the rotary shaft and configured to engage the axial journal to at least partially resist radial movement of the axial journal relative to the rotary shaft;

an inertia ring disposed circumferentially about the sleeve, such that a gap is defined between the inertia ring and the sleeve when a primary bearing system supports the rotary shaft, wherein the inertia ring engages and rotates with the sleeve and the rotary shaft when the primary bearing system does not support the rotary shaft, and wherein the axial journal engages an axial end of the inertia ring to resist axial movement of the rotary shaft when the primary bearing assembly does not support the rotary shaft.

10. The auxiliary bearing system of claim 9, wherein the gripping assembly is further disposed in an annular space between the axial journal and the rotary shaft, such that the gripping assembly engages an inner radial surface of the axial journal and an outer radial surface of the rotary shaft, thereby at least partially preventing radial movement of the axial journal relative to the rotary shaft.

11. The auxiliary bearing system of claim 10, wherein the gripping assembly comprises a first conical ring having a tapered surface on an inner radial surface and a second conical ring having a tapered surface on an outer radial surface, the first and second conical rings being disposed in the annular space such that the tapered surface of the first conical ring and the tapered surface of the second conical ring radially oppose one another and at least partially overlap.

12. The auxiliary bearing system of claim 11, wherein coupling the locking nut to the rotary shaft forces the tapered surfaces of the first and second conical rings into gripping engagement between the inner radial surface of the axial journal and the outer radial surface of the rotary shaft.

13. The auxiliary bearing system of claim 10, wherein the gripping assembly comprises an annular ring having one or more projections extending radially therefrom, the annular ring being disposed in the annular space such that the one or more projections exert a radial load against the inner radial surface of the axial journal and the outer radial surface of the rotary shaft.

14. The auxiliary bearing system of claim 9, wherein the gripping assembly comprises one or more axial splines interposed between the axial journal and the sleeve, the plurality of axial splines comprising:

a first axial spline comprising a plurality of teeth; and a second axial spline defining a plurality of grooves, the plurality of teeth configured to engage with the plurality of grooves in an interlocking fashion.

15. A method for securing an axial journal of an auxiliary bearing system, comprising:

coupling a sleeve circumferentially about a rotary shaft;

disposing the axial journal circumferentially about the rotary shaft and adjacent an axial end of the sleeve;

coupling a locking nut to the rotary shaft to force the axial journal to engage the axial end of the sleeve, thereby preventing axial movement of the axial journal along the rotary shaft; and disposing a gripping assembly circumferentially about the rotary shaft such that the gripping assembly engages the axial journal to at least partially resist radial movement of the axial journal relative to the rotary shaft.

16. The method of claim 15, further comprising:

disposing the gripping assembly in an annular space between the axial journal and the rotary shaft; and engaging an inner radial surface of the axial journal and an outer radial surface of the rotary shaft with the gripping assembly to at least partially resist radial movement of the axial journal relative to the rotary shaft.

17. The method of claim 16, wherein the gripping assembly comprises a first conical ring having a tapered surface on an inner radial surface and a second conical ring having a tapered surface on an outer radial surface, and wherein the first and second conical rings are disposed in the annular space such that the tapered surface of the first conical ring and the tapered surface of the second conical ring radially oppose one another and at least partially overlap.

18. The method of claim 17, wherein coupling the locking nut to the rotary shaft forces the tapered surfaces of the first and second conical rings into gripping engagement between the inner radial surface of the axial journal and the outer radial surface of the rotary shaft.

19. The method of claim 16, wherein the gripping assembly comprises an annular ring having one or more projections extending radially therefrom, the annular ring being disposed in the annular space such that the one or more projections exert a radial load against the inner radial surface of the axial journal and the outer radial surface of the rotary shaft.

20. The method of claim 15, wherein the gripping assembly comprises a plurality of axial splines interposed between the axial journal and the sleeve, the plurality of axial splines comprising:

a first axial spline comprising a plurality of teeth; and a second axial spline defining a plurality of grooves, the plurality of teeth configured to engage with the plurality of grooves in an interlocking fashion.

* * * * *